(12) United States Patent
Saito et al.

(10) Patent No.: US 6,354,269 B1
(45) Date of Patent: Mar. 12, 2002

(54) METHOD AND SYSTEM FOR CONTROLLING ENGINE

(75) Inventors: Tomoaki Saito; Katsuaki Yasutomi; Yusuke Seino; Akihiro Kobayashi, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/670,695

(22) Filed: Sep. 28, 2000

(30) Foreign Application Priority Data

Sep. 29, 1999 (JP) ............................................ 11-276502

(51) Int. Cl.[7] .............................................. F02D 41/22
(52) U.S. Cl. .................... 123/436; 123/568.16; 60/285; 60/276; 73/117.3; 701/114
(58) Field of Search ............................ 123/568.16, 436; 60/285, 276; 701/114; 73/117.3

(56) References Cited

U.S. PATENT DOCUMENTS

| 5,447,137 A | * | 9/1995 | Asano et al. ................ 123/436 |
| 5,461,569 A | * | 10/1995 | Hara et al. .................. 73/117.3 |
| 5,630,397 A | * | 5/1997 | Shimizu et al. ............. 123/436 |
| 5,750,886 A | * | 5/1998 | Lambert et al. ........... 73/117.3 |
| 5,806,014 A | * | 9/1998 | Remboski et al. .......... 701/114 |
| 5,943,999 A | * | 8/1999 | Yoshihara et al. ..... 123/568.16 |
| 5,996,337 A | * | 12/1999 | Blosser et al. ................ 60/285 |
| 6,003,307 A | * | 12/1999 | Naber et al. .................. 60/285 |

FOREIGN PATENT DOCUMENTS

JP          8-200045         8/1996

* cited by examiner

*Primary Examiner*—Erick Solis
(74) *Attorney, Agent, or Firm*—Nixon Peabody LLP; Donald R. Studebaker

(57) ABSTRACT

When refreshing a catalyst (22) disposed in an exhaust line (20) during operation of a diesel engine (1), diesel engine control increases supercharging pressure by throttling nozzles of a turbocharger (25) so as to increase an amount of air that is charged into a combustion chamber (4) and then opens an exhaust gas recirculation valve (24) and holds it open until a exhaust gas recirculation ratio reaches a specified value. Subsequently, the diesel engine control increases an amount of fuel injection until a mean combustion chamber air-to-fuel ratio reaches a value near a stoichiometric air-to-fuel ratio so as to lower the oxygen concentration of exhaust gas, thereby causing the catalyst (22) to release NOx therefrom and purify the exhaust gas.

7 Claims, 13 Drawing Sheets

METHOD AND SYSTEM FOR CONTROLLING ENGINE

FIELD OF THE INVENTION

The present invention relates to a system for performing control of an engine and diagnosing the control of an engine.

DESCRIPTION OF RELATED ART

It has been known in the art to increase the amount of HC (hydrocarbon that is unburned fuel and reformed HC due to combustion) in exhaust gas by performing fuel injection divided into a plurality of parts through a fuel injector that sprays fuel directly into a combustion chamber. For example, fuel injection control is performed by spraying fuel through main fuel injection only at a point of time near a top dead center of a compression stroke while an engine operates in ordinary engine operating conditions. In order to increase the HC concentration of exhaust gas, the fuel injection control is performed by spraying fuel through post-fuel injection subsequently to the main fuel injection according to engine operating conditions when necessary. In the case where NOx trapping substance operative to absorb NOx in exhaust gas is provided in an exhaust gas passage, the amount of the HC concentration of exhaust gas is increased for the purpose of causing the NOx trapping substance to release NOx or supplying HC as a deoxidizing substance to a catalyst for purifying exhaust gas by deoxidizing NOx in the exhaust gas.

Japanese Unexamined Patent Publication No. 8-200045 discloses a system having a NOx trapping substance in an exhaust passage which performs fuel injection at a point of time near a top dad center in a compression stroke while an engine operates in ordinary engine operating conditions. The system performs post-fuel injection in either an expansion stroke or an exhaust stroke, additionally to the main fuel injection that is implemented at a point of time near the dead top center of the compression stroke, so as to decline an exhaust gas air-to-fuel ratio when releasing NOx from the NOx trapping substance. The term "exhaust gas air-to-fuel ratio" as used herein shall mean and refer to a ratio of the entire amount of air relative to the entire amount of fuel in exhaust gas. NOx released from the NOx trapping substance reacts on HC or CO on a noble metal catalyst such as platinum and the like and then is deoxidized. The system that Japanese Unexamined Patent Publication No. 8-200045 discloses is configured and adapted to close an exhaust gas recirculation passage so as to prevent recirculation of a large amount of unburned fuel from being admitted into an intake stream when implementing fuel injection for refreshing the NOx trapping substance while the engine operates in a region of lower and moderate engine loads where a large amount of exhaust gas is expected to be recirculated.

In the case of increasing the HC concentration of exhaust gas by means of altering the mode of fuel injection, it is definitely required that the mode of fuel injection is altered as previously scheduled. Therefore, it is preferred to ascertain whether a fuel injection mode is normally altered as scheduled. As a means for ascertainment of a normal alteration in fuel injection mode, an HC sensor may be disposed in the exhaust gas passage to detect the HC concentration of exhaust gas. A change in output from the HC sensor is checked at an occurrence of an alteration in fuel injection mode in order to make a decision as to whether or not the fuel injection mode alteration control is normal or should be corrected. However, because exhaust gas contains different kinds of HC, detection of HC concentrations of the exhaust gas by the HC sensor is hardly accurate.

In place of detecting the HC concentration of exhaust gas, it may be carried out to detect the concentration of oxygen (O2) or NOx of exhaust gas. That is, since a change in HC concentration of exhaust gas is revealed as a change in exhaust gas air-to-fuel ratio or oxygen concentration of exhaust gas, a change in HC concentration of exhaust gas is monitored indirectly by monitoring the oxygen concentration of exhaust gas. In the case where a NOx deoxidizing catalyst is provided in the exhaust gas passage, since an increase in HC concentration of exhaust gas quickens deoxidization of NOx, the NOx concentration of exhaust gas declines as the HC concentration of exhaust gas increases. On the grounds, a change in HC concentration of exhaust gas is monitored indirectly by monitoring the NOx concentration of exhaust gas.

However, though the oxygen sensor is suitable for detection as to whether an exhaust gas air-to-fuel ratio is near a specific ratio, nevertheless, the oxygen sensor is hard to detect a wide range of oxygen concentrations of exhaust gas even if it is of a linear type. There are less types of NOx sensors that are simple in construction and capable of accurately detecting NOx concentrations of exhaust gas. Further, because HC is low in reactivity on O2 or NOx while the exhaust gas is at low temperatures, so that it is hard to detect accurate HC concentrations of exhaust gases. In addition, processing an output from the sensor is apt to make control complicated.

SUMMARY OF THE INVENTION

It is an object of the present invention to provide an engine control system which is capable of diagnosing whether not only fuel injection mode alteration control but also a change in composition of exhaust gas are achieved as expected without using a sensor which detects a component concentration of exhaust gas.

It is another object of the present invention to provide an engine control system which is capable of correcting fuel injection mode alteration control without using a sensor which detects a component concentration of exhaust gas.

The foregoing objects of the present invention are accomplished by diagnosing normality or abnormality of the fuel injection mode alteration control or correcting the fuel injection mode alteration control on the basis of engine output which varies according to a HC content of recirculated exhaust gas.

According to an aspect of the present invention, the diagnostic system for diagnosing normality or abnormality of control of an engine which is equipped with a fuel injector for supplying fuel into the combustion chamber, exhaust gas control means for controlling a change in composition of exhaust gas from the engine so as to cause a change in HC concentration of the exhaust gas according to engine operating conditions and an exhaust gas recirculation system for recirculating partly exhaust gas into an intake system of the engine comprises output detecting means for detecting engine output of the engine and diagnostic means for making a diagnosis of normality or abnormality of the control of the change in composition of the exhaust gas when the engine output does not causes a predetermined change meeting to the change in HC concentration of the recirculated exhaust gas after the change in composition of the exhaust gas.

When the exhaust gas control means controls a change in composition of exhaust gas so as to causes a change in HC concentration, since exhaust gas is partly recirculated into an intake system of the engine, the HC content of burned gas in the combustion chamber of an engine varies with a time lag behind the change in composition of the exhaust gas as long as the control of a change in composition of exhaust gas is performed as expected. The change in HC content of exhaust gas appears as a change in engine output. When the engine output does not change correspondingly to a change in composition of exhaust gas, namely, a change in HC concentration of recirculated exhaust gas as expected, this indicates that the change in composition of exhaust gas fails to meet the expectation, then the control of a change in composition of exhaust gas is regarded as abnormal. The change in composition of exhaust gas such as to cause a change in HC concentration such as, for example, a change in fuel combustion in the combustion chamber, is achieved by an alteration of fuel injection mode such as a change in the amount of fuel injection, a change in the number of times of fuel injection or a change in fuel injection timing, or a change in ignition timing if the engine is of a spark-ignition type. Therefore, when the control is judged to be abnormal, it can be said that the fuel injector or its control system, or the ignition device or its control system fail to operate normally.

Employed as the output detecting means is one operative to detect a physical value (magnitude of shaft torque, a fluctuation in shaft torque, a change rate of shaft torque, an angular speed of an crankshaft, etc.) relating to shaft torque of the engine which periodically changes. The diagnosis of normality or abnormality of the control on the basis of a physical value detected by the output detecting means, more specifically, on the result of comparison of the physical value with a judging threshold value.

In the case where the fuel injector is disposed so as to spray fuel directly into the combustion chamber of the engine, the exhaust gas control means controls a number of times and timings of fuel injection in a period from the beginning of an intake stroke and an end of an exhaust stroke according to engine operating conditions.

A sensor operative to detect oxygen concentration or NOx concentration of exhaust gas may be provided downstream from an inlet of an exhaust gas recirculation passage. When the oxygen concentration of exhaust gas is lower than a judging threshold value or when the NOx concentration of exhaust gas is higher than a judging threshold value, the diagnosis of normality or abnormality of the control by the diagnostic means can be restrained. That is, the fact that the oxygen concentration of exhaust gas is lower than the judging threshold value or the fact that the NOx concentration of exhaust gas is higher than the judging threshold value indicates that the exhaust gas which is not recirculated and is directed to the sensor contains a large amount of HC, in other words, that the amount of recirculated exhaust gas is small. In this event, because the recirculation of exhaust gas has a less influence on engine output, due to which a diagnosis error is apt to occur, the control by the diagnostic means can be restrained.

In place of restraining the diagnosis of normality or abnormality of the control, it may be done in order to make a diagnosis either to increase the amount of exhaust gas recirculation, to change the judging threshold value, or to change a combustion state so as to increase the amount of HC in exhaust gas by, for example, increasing the amount of fuel injection.

According to another aspect of the present invention, the diagnostic system diagnoses normality or abnormality of control of an engine which is equipped with a fuel injector for supplying fuel into the combustion chamber, exhaust gas control means for controlling a change in composition of exhaust gas from the engine so as to cause a change in HC concentration of the exhaust gas according to engine operating conditions and an exhaust gas recirculation system for recirculating partly exhaust gas into an intake system of the engine. The diagnostic system comprises output detecting means for detecting engine output of the engine, fuel injection control means for detecting a change in the engine output following a change in HC concentration of the recirculated exhaust gas and feedback controlling an amount of fuel injection, that is sprayed by the fuel injector, on the basis of the engine output so as to provide a predetermined engine output, and diagnostic means for making a diagnosis of abnormality of the control of the change in composition of the exhaust gas when a feedback control value for the amount of fuel injection exceeds a predetermined extent.

Since the feedback control value corresponds to a deviation of an actual change in HC concentration of exhaust gas due to the change in composition of exhaust gas from an expected change in HC concentration of exhaust gas, if the feedback control value exceeds the predetermined extent, namely, the variation is too large, this indicates that the composition of the exhaust gas is not changed as intended, then, the control is judged to be abnormal.

According to another aspect of the present invention, the engine control system for controlling of an engine which is equipped with a fuel injector for supplying fuel into the combustion chamber, exhaust gas control means for controlling of a change in composition of exhaust gas from the engine so as to cause a change in HC concentration of the exhaust gas according to engine operating conditions and an exhaust gas recirculation system for recirculating partly exhaust gas into an intake system of the engine comprises output detecting means for detecting engine output of the engine and correction means for detecting a change in the engine output following the change in HC concentration of the recirculated exhaust gas and correcting the control of the change in composition of the exhaust gas on the basis of the change in the engine output.

When a change in composition of exhaust gas causes a change in HC concentration of the exhaust gas, the amount of HC appears as a change in engine output. Therefore, if the engine output does not correspond to a change in composition of the exhaust gas, the control of HC concentration of the exhaust gas is corrected so as to provide engine output corresponding to a change in composition of the exhaust gas.

As stated above, because, when engine output does not change correspondingly to a change in HC concentration of exhaust gas from the combustion chamber that is caused following a change in composition of the exhaust gas, it is decided that the change in composition of the exhaust gas is abnormal, the diagnostic system is simply configured without using a sensor which detects the component concentration of exhaust gas. Moreover, the diagnostic system is capable of diagnosing normality or abnormality of the engine control irrespective of exhaust gas temperature.

Further, because exhaust gas composition control is corrected on the basis of a change in engine output following a change in HC concentration of recirculated exhaust gas when the composition of exhaust gas from the combustion chamber so as to cause a change in HC concentration of the exhaust gas, the engine control system is simply configured without using a sensor which detects the component concentration of exhaust gas. Moreover, the engine control system is capable of correcting the exhaust gas composition control irrespective of exhaust gas temperature.

BRIEF DESCRIPTION OF THE DRAWINGS

The above and other objects and features of the present invention will be clearly understood from the following description with respect to the preferred embodiment thereof when considered in conjunction with the accompanying drawings, in which.

DETAILED DESCRIPTION OF PREFERRED EMBODIMENTS

Figure 1:
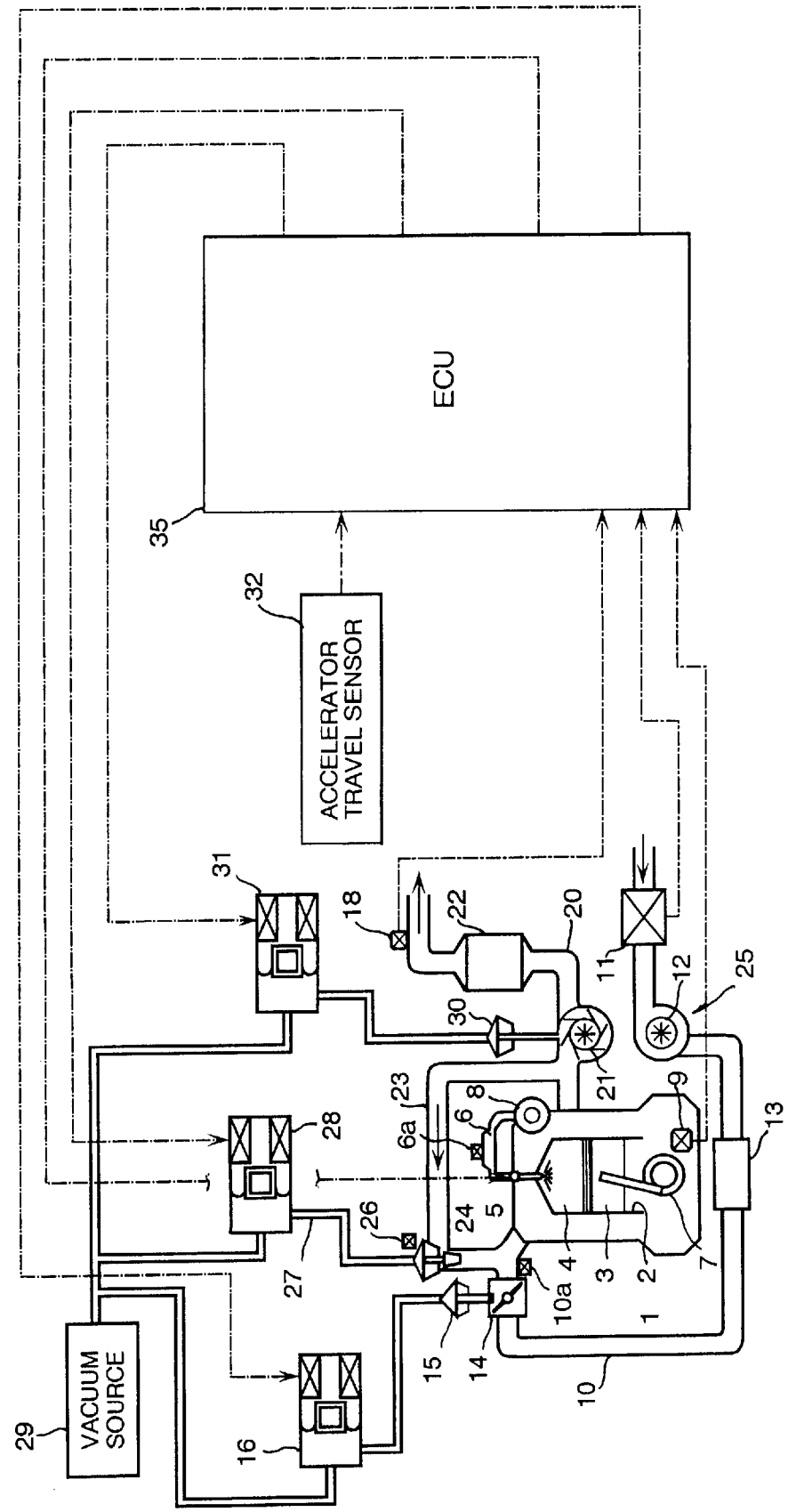
FIG. 1 is an illustration showing the overall structure of a control system for a diesel engine in accordance with a preferred embodiment of the invention.

Referring to the drawings in detail, and in particular, to FIG. 1 which shows the overall structure of a diesel engine control system 100 according to an embodiment of the present invention, denoted by a reference numeral 1 is a multiple cylinder diesel engine carried in a vehicle. The diesel engine 1 has multiple cylinders 2 (only one of which is shown in the figure) in which pistons 3 are received to slide. A combustion chamber 4 is formed inside each of the cylinders 2 by the piston 3. Also, a fuel injector (fuel injection valve) 5 is located at the center of a top of the combustion chamber 4 with its nozzle faced to the combustion chamber 4. The fuel injector 5 is opened and closed at predetermined timings to spray fuel directly into the combustion chamber 4. Each fuel injector 5 mentioned above is connected to a common rail (pressure accumulating chamber) 6 for accumulating high-pressure fuel therein, The common rail 6 is provided with a pressure sensor 6a operative to detect an internal fuel pressure as a common rail pressure and a high-pressure supply pump 8 which is driven by a crank shaft 7 of the diesel engine 1. The high-pressure supply pump 8 regulates the fuel pressure in the inside of the common rail 6, which is detected by the pressure sensor 6a, and holds it above a specified pressure level of, for example, 20 Mpa during engine idling or 50 Mpa during engine operation other than idling. Further, a crank angle sensor 9, which may take the form of electromagnetic pick-up well known to those in the art, is provided to detect a rotational angle of the crank shaft 8. The crank angle sensor 9 comprises a plate with peripheral projections for detection (not shown) secured to one end of the crank shaft 7 and an electromagnetic pickup (not shown) arranged correspondingly in position to the outer periphery of the plate. The electromagnetic pickup outputs a pulse signal in response to one of the peripheral projections arranged at regular angular intervals.

The diesel engine 1 has an intake passage 10 through which intake air is introduced and supplied into the combustion chamber 4 of the engine 1 via an air cleaner (not shown). The intake passage 10 at a downstream end is branched off from a surge tank (not shown) and is connected respectively to the combustion chambers 4 of the cylinders 2 through intake ports. A charging pressure sensor 10a is provided in order to detect a supercharging pressure in the inside of the surge tank that is supplied to the respective cylinders 2. The intake passage 10 is further provided, in order from the upstream end to the downstream end, with a hot film type of air flow sensor 11 operative to detect an amount of fresh intake air which is introduced into the intake passage 10, a blower 12 which is driven by a turbine 21 of a turbocharger 25 to compress intake air, an intercooler 13 operative to cool down the intake air that is compressed by the blower 12, and an intake throttle valve 14 as means operative to reduce the amount of fresh intake air by reducing a cross-sectional area of the intake passage 10. The intake throttle valve 14 is of a type comprising a butterfly valve which has a notch so as to admit intake air therethrough even while it is fully closed. Similar to an exhaust gas recirculation (EGR) valve 24 which will be described later, the intake throttle valve 14 is controlled to change its opening by controlling the level of negative pressure acting on a diaphragm 15 by an electromagnetic valve 16 for negative pressure control. A sensor is provided to detect an opening of the intake throttle valve 14.

Denoted by a reference numeral 20 is an exhaust passage into which exhaust gas is discharged from the combustion chamber 4 of each cylinder 2. The exhaust passage 20 at the upstream end is branched off and connected to the combustion chambers 4 of the cylinders 2 through exhaust ports and is provided, in order from the upstream end to the downstream end, with the turbine 21 which is driven by an exhaust gas flow, a catalytic converter 22 capable of lowering emission levels of HC, CO and NOx and particulates in exhaust gas so as thereby to purify the exhaust gas, and an oxygen (O2) sensor (which is hereafter referred to as a linear O2 sensor) 18 operative to detect the oxygen concentration of exhaust gas in the exhaust passage 20.

The catalytic converter 22 has two catalyst layers formed on the wall surface of a number of pours or holes of a cordierite honeycomb substrate (not shown) which are directed in parallel to one another in an axial direction (the same direction of an exhaust gas flow) and has the characteristic that it absorbs NOx in exhaust gas having a high oxygen concentration, namely, excess oxygen exhaust gas and releases NOx while the catalyst layers are exposed to exhaust gas in a rich state where the exhaust gas has a lower oxygen concentration than the excess oxygen exhaust gas so as thereby to purify the exhaust gas. Specifically, the catalyst 22 comprises an inner catalyst layer carrying platinum (Pt) as a noble metal and barium (Ba) as a NOx trapping substance, both of which are supported by alumina and ceria, and an outer catalyst layer carrying platinum (Pt) which is supported by zeolite. The catalyst 22 functions not only as a oxidizing catalyst that oxidizes HC but also as a deoxidizing catalyst that deoxidizes NOx in excess oxygen exhaust gas as well as in exhaust gas from combustion of a stoichiometric air-fuel mixture. The catalyst 22 also works as a three-way catalyst at air-to-fuel ratios close to a stoichiometric air-to-fuel ratio.

Figure 2A:
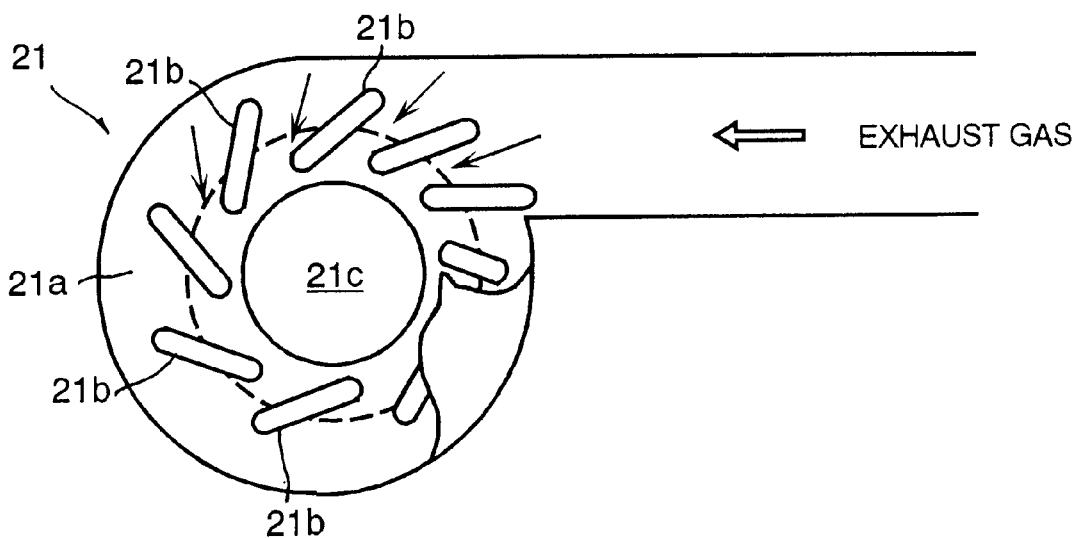
FIG. 2A is an explanatory cross-sectional view showing a turbine of a variable geometric turbocharger in which an A/R ratio is small.
Figure 2B:
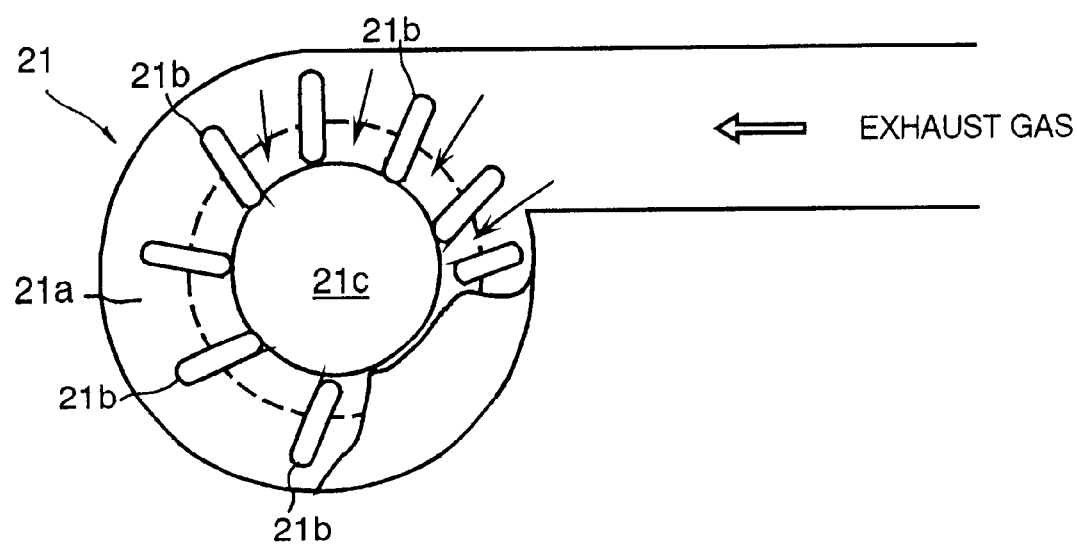
FIG. 2B is an explanatory cross-sectional view showing the turbine of the variable geometric turbocharger in which the A/R ratio is large.

Referring to FIGS. 2A and 2B, the turbocharger 25 is of a variable geometric type and comprises the turbine 21 and the blower 12. The turbine 21 has a number of variable vanes 21b arranged in a turbine chamber 21a so as to surround the entire periphery of the turbine chamber 21a. These variable vanes 21b are variable in angle to change a nozzle cross-sectional area (A) through which exhaust gas flows. In the variable geometric turbocharger 25, as shown in FIG. 2A, the variable vanes 21b are positioned at small angles relative to the circumferential direction of the turbine 21 so as to narrow the nozzle cross-sectional area (A), which causes an increase in supercharging efficiency even in a region of lower engine speeds where an exhaust gas stream is small. On the other hand, as shown in FIG. 2B, the variable vanes 21b are directed to the center of the turbine 21 so as to broaden the nozzle cross-sectional area (A) with an effect of increasing supercharging efficiency even in a region of higher engine speeds where an exhaust gas stream is large.

Figure 3:
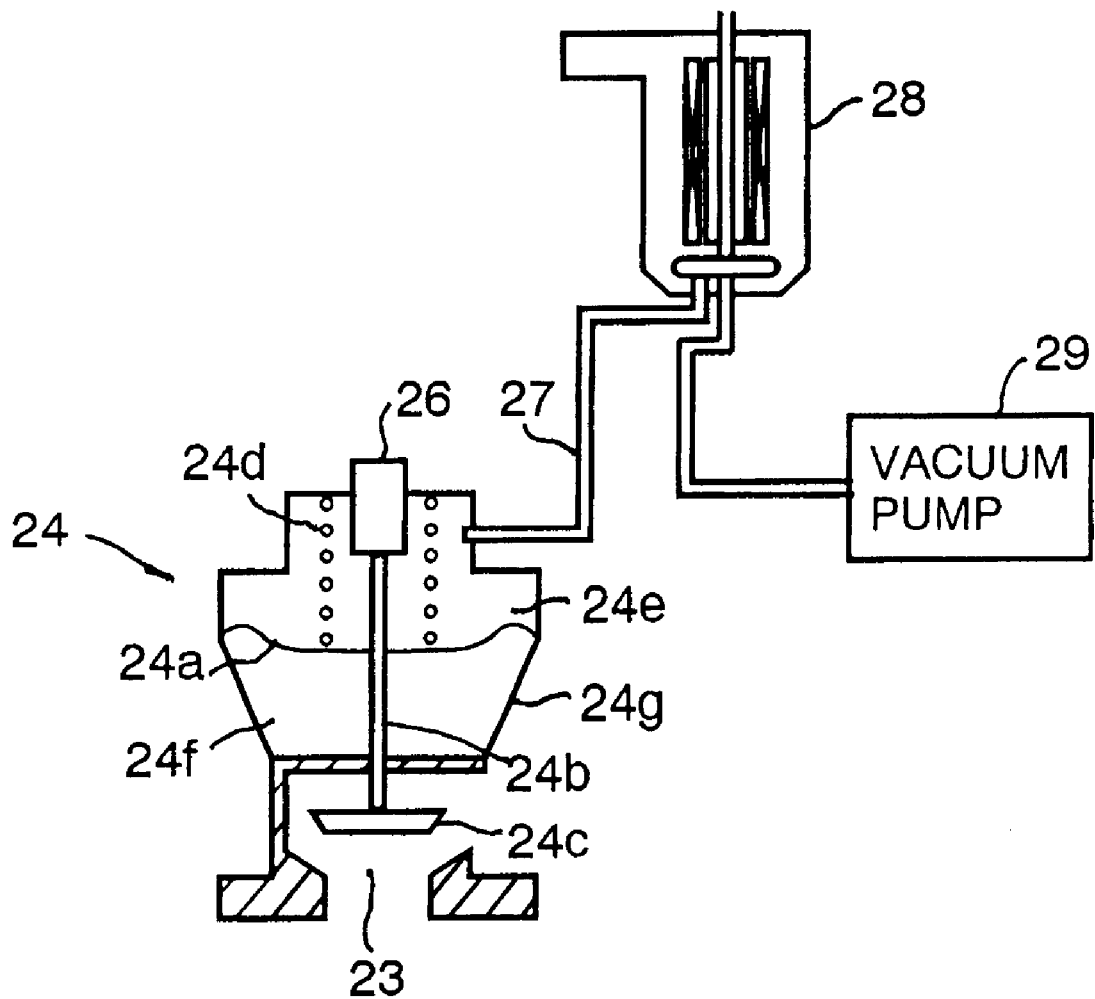
FIG. 3 is an illustration showing the structural of an exhaust gas recirculation valve and its associated drive mechanism.

The exhaust passage 20 at the upstream from the turbine 21 is branched off and connected to an exhaust gas recirculation (EGR) passage 23 through which exhaust gas is partly recirculated into the intake stream. The exhaust gas recirculation passage 23 at the downstream end is connected to the intake passage 10 at a further downstream side relative to the intake throttle valve 14. The exhaust gas recirculation passage 23 at a point close to the downstream end is provided with the exhaust gas recirculation valve 24 which is operated by negative pressure to adjust its opening so as to admit partly exhaust gas from the exhaust passage 20 into the intake passage 10. The exhaust gas recirculation valve 24, as shown in FIG. 3, comprises a valve rod 24b connected to a diaphragm 24a by which a valve box 24g is divided into upper and lower chambers 24e and 24f, and a valve body 24c which adjustably opens or closes the exhaust gas recirculation passage 23 so as to linearly change an area through which exhaust gas flows. The exhaust gas recirculation valve 24 is provided with a lift sensor 26 secured to one end of the valve rod 24b. The valve body 24c is forced by a spring 24d in a closing direction (downward as viewed in FIG. 3). A vacuum passage 27 is connected between a vacuum pump (pressure source) 29 through an electromagnetic valve 28 which controls negative pressure. The negative pressure in the vacuuming chamber 24e, with which the exhaust gas recirculation valve 24 is driven, is controlled by energizing the electromagnetic valve 28 with a control signal (electric current) from an electronic control unit (ECU) 35, which comprises a microcomputer, to open or shut the vacuum passage 27, by means of which the exhaust gas recirculation passage 23 is linearly changed in its opening by the valve body 24c. Similarly to the exhaust gas recirculation valve 24, the turbocharger 25 is provided with a diaphragm 30 in connection with the variable vanes 21b of the turbine 21 such that the variable vanes 21b are controlled in angle relative to the turbine 21 by controlling a negative pressure on the diaphragm 30 by an electromagnetic valve 31 operative to control negative pressure. Although not shown in FIGS. 2A and 2B, the arrangement of vanes 21b is linked to a diaphragm, similar to that of the exhaust gas recirculation valve 24, operative to regulate vane openings according to a negative pressure applied thereto through an electromagnetic valve 31.

The electronic control unit 35 receives signals from the pressure sensor 6a, the crank angle sensor 9, the air flow sensor 11, the O2 sensor 18, the lift sensor 26 of the exhaust gas recirculation valve 24, and an accelerator travel sensor 32 for detecting a travel of an accelerator pedal (not shown), respectively. The electronic control unit 35 provides control signals by which the fuel injector 5, the high-pressure supply pump 8, the intake throttle valve 14, the exhaust gas recirculation valve 24, the variable vanes 21b of the turbocharger 25 are operated. While the fuel injector 5 is controlled to spray a controlled amount of fuel at a controlled timing in accordance with engine operation conditions, at the same time, control of the common rail pressure, i.e. the fuel injection pressure, is made by the high-pressure supply pump 8. In addition, control of the amount of intake air by the intake throttle valve 14, control of the amount of exhaust gas recirculation by the exhaust gas recirculation valve 24, and control of the variable vanes 21b of the turbocharger 25 are carried out. More specifically, a fuel injection control map that prescribes a basic amount of fuel which is empirically determined in appropriate accordance with changes in target engine output torque and engine speed and is electronically stored in a memory of the electronic control unit 35. Ordinarily, a basic amount of fuel Qbase is read in from the fuel injection control map based on a target engine output torque which is determined in accordance with an output signal from the accelerator travel sensor 32 and an engine speed which is determined in accordance with an output signal from the crank angle sensor 9. A pulsing period of time for which the fuel injector 5 is energized and kept open is determined on the basis of the basic amount of fuel Qbase and the common rail pressure detected by the pressure sensor 6a. Fuel injection control is performed so as to supply an amount of fuel meeting the target engine output torque. As a result, the engine 1 operates at a combustion chamber air-to-fuel ratio in a significantly lean state where an air-fuel ratio is equal to or greater than 18.

The engine control system is characterized by increasing the HC concentration of exhaust gas by altering the fuel injection mode according to engine operating conditions (which include the state of catalyst) as well as correcting the fuel injection control on the basis of engine output. The engine control system is characterized by deciding on the basis of engine output whether the fuel injection mode alteration control (including control of the fuel injector 5) is abnormal.

An alteration of fuel injection mode is implemented between a main or primary fuel injection at a point of time near a top dead center of a compression stroke and a post-fuel injection in either an expansion stroke or an exhaust stroke following the primary fuel injection. The HC concentration of exhaust gas is increased in a fuel injection mode where both primary fuel injection and post-fuel injection are implemented.

Figure 4A:
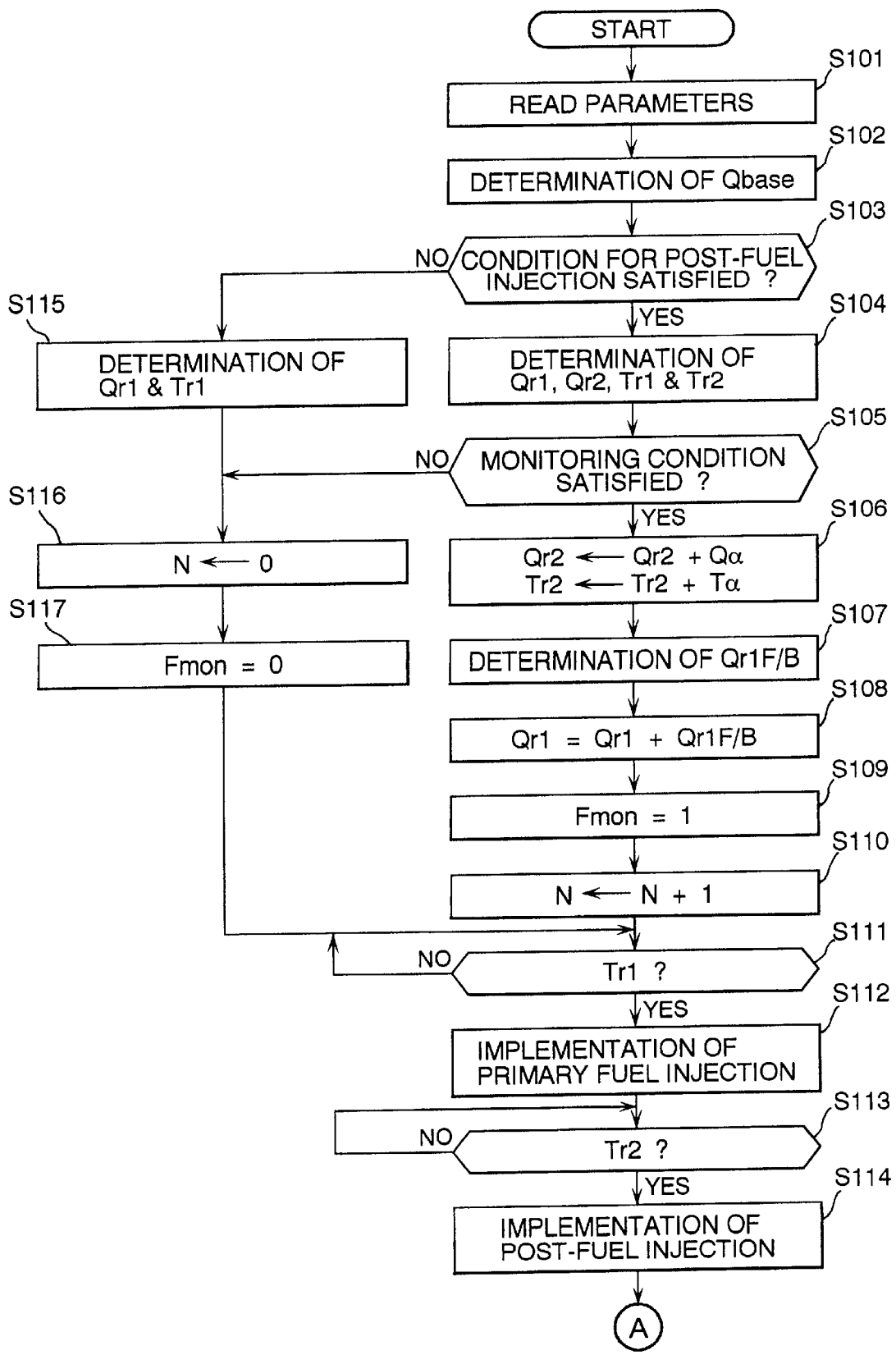
FIGS. 4A and 4B are respective parts of a flow chart illustrating a sequence routine of diagnosis and correction of fuel injection mode alteration control.
Figure 4B:
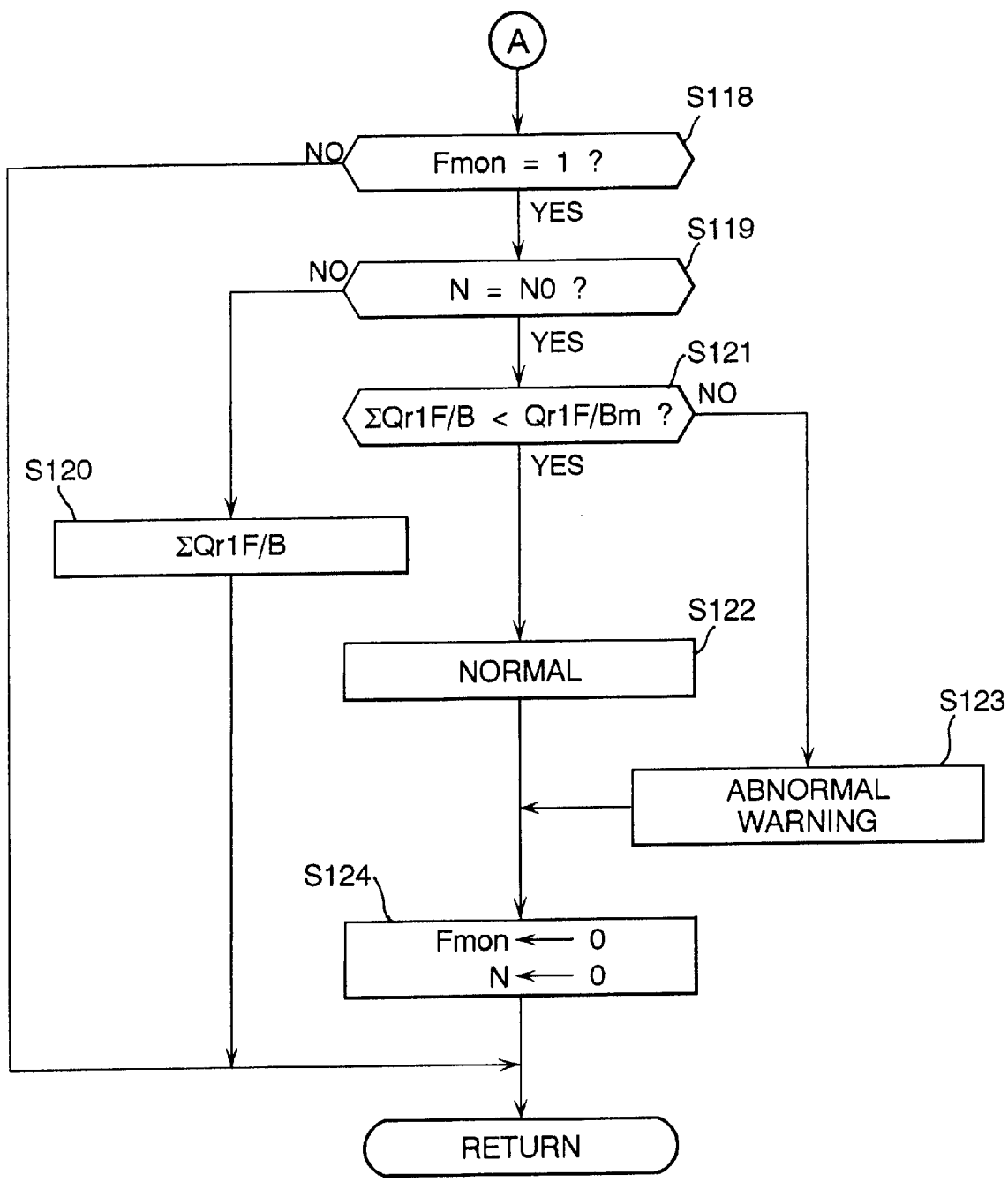
Figure 7:
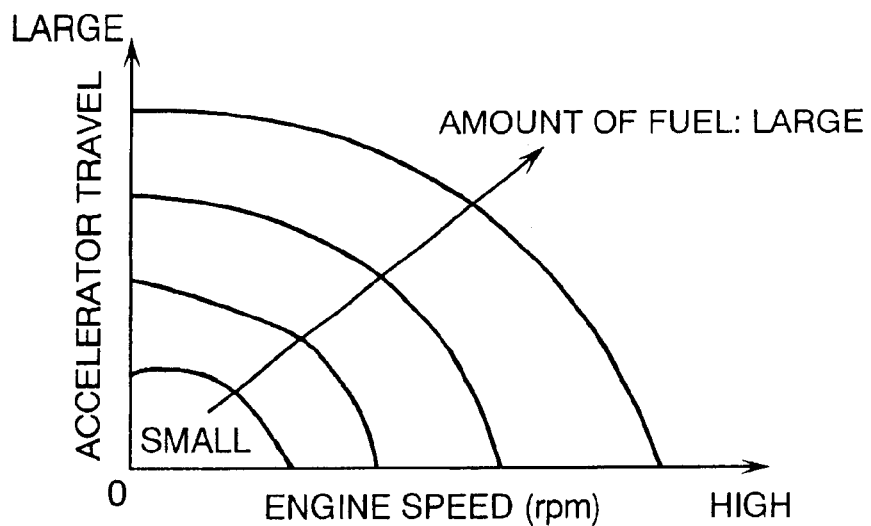
FIG. 7 is a basic fuel injection control map with respect to accelerator travel and engine speed shown by way of example.

FIGS. 4A and 4B are respective parts of a flow chart illustrating a main sequence routine of the fuel injection mode alteration control for the microcomputer of the electronic control unit 35 and diagnosis of normality of the fuel injection mode alteration control. The fuel injection mode alteration control is carried out for every predetermined crank angle independently per cylinder 2. When the flow chart logic commences and control proceeds to a block at step S101 where various control parameters represented by signals from the pressure sensor 6a, the crank angle sensor 9, the air flow sensor 11, the O2 sensor 18, the lift sensor 26 and the accelerator travel sensor 32 are read. Subsequently, a basic amount of fuel Qbase is determined with respect to a target engine output torque which is determined from the accelerator travel and an engine speed which is determined from the crank angle with reference to a fuel injection control map at step S102, In this instance, the fuel injection control map prescribes an optimum amount of fuel Q is empirically defined as a basic amount of fuel Qbase in accordance with a change in accelerator travel and engine speed as exemplary shown in FIG. 7. In the fuel injection control map, the basic amount of fuel Qbase is defined so as to become larger with an increase in accelerator travel and with an increase in engine speed.

Thereafter, a decision is made at step S103 as to whether or not a condition for implementation of the post-fuel injection is satisfied. Satisfaction of the condition for the post-fuel injection is attained every specified interval while the engine 1 operates in an ordinary state. That is, in the ordinary engine operating state, fuel injection is periodically altered between a single-shot fuel injection mode in which only the primary fuel injection is implemented and a two-shot fuel injection mode in which both primary fuel injection and post-fuel injection are implemented. The fuel injection modes continue for predetermined periods of time, respectively. The periodical alteration of fuel injection mode is performed for the purpose of periodically arising the HC concentration of exhaust gas to which the catalyst 22 is exposed so as thereby to increase the NOx conversion efficiency of the catalyst 22. That is, although the NOx conversion efficiency of catalyst increases at the beginning of a raise in the HC concentration of exhaust gas, it gradually declines when exhaust gas is kept high in the HC concentration. However, when the HC concentration of exhaust gas periodically raises and declines, the catalyst intermittently remains performing with a high NOx conversion efficiency. Therefore, in view of an overall performance of the catalyst, a high NOx conversion efficiency is kept high.

The two-shot fuel injection mode may be implemented for a specified period of time when a NOx sensor, which is disposed in the exhaust passage 20 downstream from the catalytic converter 22, detects a NOx concentration of exhaust gas greater than a specified level. That is to say, because the catalytic converter 22 contains the NOx trapping substance, an increase in the NOx concentration of exhaust gas indicates that the NOx trapping substance is reaching a state of saturation. Therefore, the fuel injection mode alteration control quickens the NOx trapping substance to release NOx by causing a raise in the HC concentration of exhaust gas due to an alteration of fuel injection mode, in other words, by declining an oxygen concentration of exhaust gas around the NOx trapping substance lower than, for example, 1%.

Figure 8:
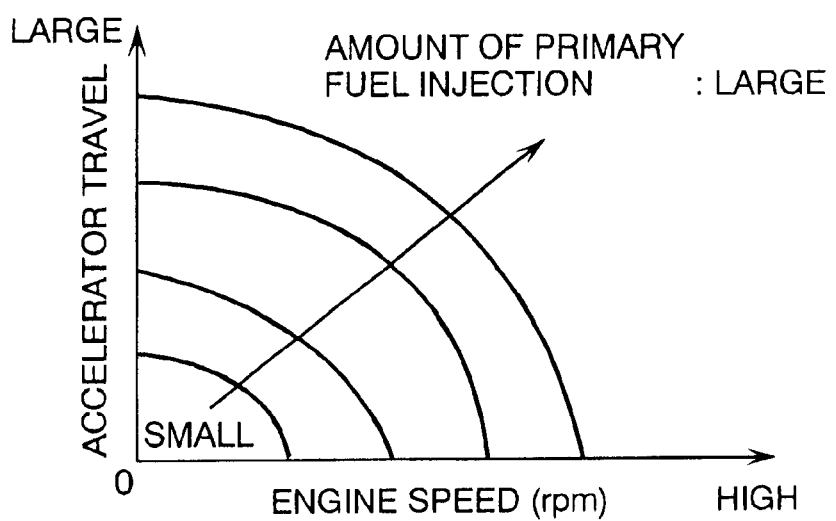
FIG. 8 is a main fuel injection control map with respect to accelerator travel and engine speed shown by way of example.

When the condition for implementation of the post-fuel injection is satisfied at step S103, while the basic amount of fuel Qbase is made ineffectual, amounts (Qr1, Qr2) and timings (Tr1, Tr2) of primary fuel injection and post-fuel injection are determined, respectively, at step S104. The amounts of fuel injection (Qr1, Qr2) for the main fuel injection and the post-fuel injection are read from fuel injection control maps, respectively. For example, as shown in FIG. 8, the fuel injection control map for the amount of primary fuel injection prescribes an optimum amount of primary fuel injection which is empirically determined in appropriate accordance with changes in accelerator travel and engine speed and is electronically stored in the memory of the electronic control unit 35. As shown, the amount of primary fuel injection (Qr1) is determined so as to become larger with an increase in engine speed and an increase in accelerator travel. Though the fuel injection control map of the amount of post-fuel injection (Qr2) is not shown, it is similar to the fuel injection control map for the amount of primary fuel injection. The amount of primary fuel injection (Qr1) is always larger than the amount of post-fuel injection (Qr2). The ratio of the amount of post-fuel injection (Qr2) relative to the amount of primary fuel injection (Qr1) (which is hereafter referred to as the fuel injection ratio Qr2/Qr1) is restrained between approximately 0.3 and 0.5. The fuel injection ratio Qr2/Qr1 is determined such as to become smaller with an increase in engine load. The timing of primary fuel injection Tr1 is set to be close a top dead center of a compression stroke. Specifically, the primary fuel injection is advanced more from a standard point, for example, a point of 5° in crank angle (CA) before the top dead center (BTDC 5° CA) with an increase in the amount of primary fuel injection Qr1 or retarded more from the standard point with a decrease in the amount of primary fuel injection Qr1. The timing of post-fuel injection Tr2 is set in a period from termination of the main fuel injection and a mid-point of an expansion stroke such as a period between, for example, 60° and 90° in crank angle after the top dead center (ATDC). The post-fuel injection is advanced more from the standard point with an increase in engine load or retarded more with a decrease in engine load. As described above, since the post-fuel injection is retarded and timed at a timing Tr2 significantly delayed from the top dead center of a compression stroke, it has an influence, which is less according to the degree of retardation, on engine output, so that fuel sprayed through the post-fuel injection is mainly used to increase the HC concentration of exhaust gas.

When the condition for implementation of the post-fuel injection is unsatisfied at step S103, the flow chart logic proceeds to a block at step S115 where the amount of primary fuel injection Qr1 is set to the basic amount of fuel injection Qbase and the timing of primary fuel injection Tr1 is determined. Subsequently, resetting the number of implementation of monitor post-fuel injection (monitoring number) N to 0 at step S116 and resetting a monitoring flag Fmon to a state of 0 at step S117, the flow chart logic proceeds to a decision at step S111 to implement the monitoring post-fuel injection at step S112. That is, when the condition for implementation of the post-fuel injection is unsatisfied, fuel injection is performed through the primary fuel injection only. In this instance, the amount of primary fuel injection Qr1 is set to the basic amount of fuel injection Qbase and the primary fuel injection Tr1 is set at a point of time close to the top dead center of a compression stroke, which is for example at a BTDC 5° CA and is advanced from the BTDC 5° CA with an increase in the amount of primary fuel injection Qr1 or retarded more from BTDC 5° CA with a decrease in the amount of primary fuel injection Qr1.

Subsequently to determination of the amounts (Qr1, Qr2) and timings (Tr1, Tr2) of primary fuel injection and post-fuel injection at step S104, a decision is made on the basis of engine output at step S105 as to whether a condition for monitoring the fuel injection mode alteration control is satisfied. Satisfaction of the condition for monitoring the fuel injection mode alteration control is attained when diagnosis of abnormality of the fuel injection mode alteration control does not yet terminate since an engine start. When the condition for monitoring the fuel injection mode alteration control is satisfied at step S105, the post-fuel injection is altered for monitoring by increasing the amount of post-fuel injection Qr2 by an amount of fuel Qα and retarding the post-fuel injection timing Tr2 by an crank angle Trα. The retarded post-fuel injection timing Tr2 is between ATDC 50° CA and ATDC 100° CA at step S106. The increase in the amount of post-fuel injection Qr2 and the retardation of the post fuel injection timing Tr2 are caused in order to make it easy to monitor the fuel injection mode alteration control by increasing the HC concentration of exhaust gas while preventing a raise in engine shaft torque due to combustion of fuel that is sprayed through the post-fuel injection. That is, it is intended to monitor only a change in engine shaft torque that is caused due to exhaust gas recirculation.

Thereafter, a correction value determination subroutine is called for to determine a correction value Qr1F/B for feedback controlling the amount of primary fuel injection Qr1 at step S107. Then, the amount of primary fuel injection Qr1 is corrected by adding the correction value Qr1F/B at step S108. Subsequently, after setting the monitoring flag Fmon to a state of 1 at step S109, the monitoring number N is changed by an increment of 1 at step S110.

Figure 5:
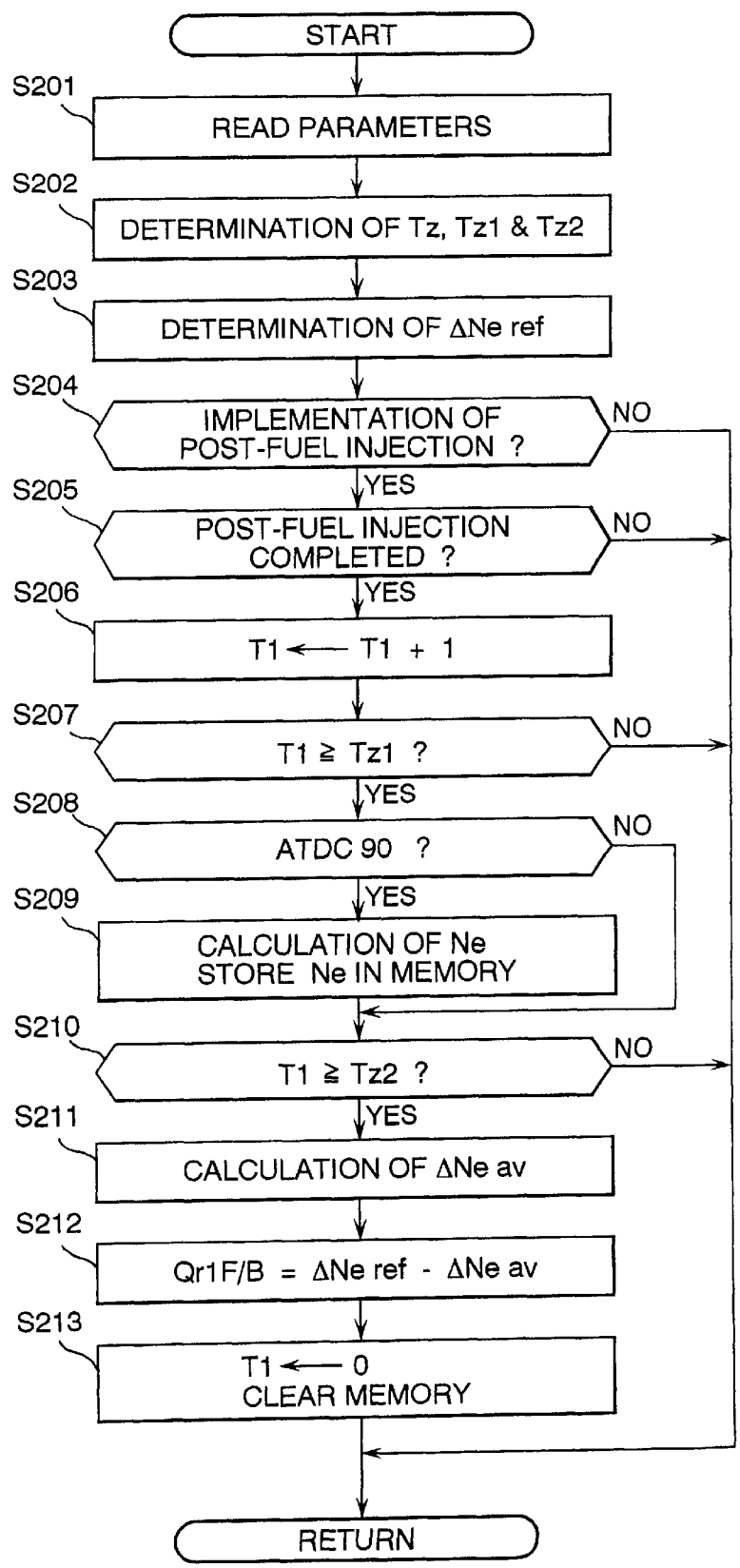
FIG. 5 is of a flow chart illustrating a sequence subroutine of calculation of feedback correction value for an amount of main fuel injection in the sequence routine of diagnosis and correction of fuel injection mode alteration control.

Referring now to FIG. 5, which is a flow chart illustrating the correction value determination subroutine for the microcomputer of the electronic control unit 35, the first step S201 in FIG. 5 is to read control parameters represented by signals from at least the crank angle sensor 9, the air flow sensor 11 and the accelerator travel sensor 32. Subsequently, an influence time zone Tz for which an influence of the post-fuel injection appears on engine output is set at step S202. When implementing the post-fuel injection, the HC concentration of exhaust gas raises. The exhaust gas having a raised HC concentration is partly recirculated into the intake passage and introduced into the combustion chamber of a cylinder that is in an intake stroke. As a result, fuel that is sprayed through the fuel injector 5 and HC contained in the recirculated exhaust gas are burned together. There is a time delay before an influence of a raise in the HC concentration of exhaust gas that is caused by the post-fuel injection appears on engine output. Therefore, an influence appearing time Tz1 and an influence disapearing time Tz2 are read in from influence appearing time map and influence disappearing time map (not shown), respectively. The influence appearing time Tz1 is a measurement from a time at which the post-fuel injection is implemented to a time at which an influence of the post-fuel injection begins to appear on engine output. The influence disappearing time Tz2 is a measurement from a time at which the post-fuel injection is implemented to a time at which an influence of the post-fuel injection disappears from engine output. The influence appearing time map prescribes an influence appearing time Tz1 which is empirically determined with respect to engine speed and accelerator travel and is electronically stored in a memory of the electronic control unit 35. Similarly, the influence disappearing time map prescribes an influence disappearing time Tz2 which is empirically determined with respect to engine speed and accelerator travel and is electronically stored in a memory of the electronic control unit 35. Each of the influence appearing time Tz1 and the influence disappearing time Tz2 is defined so as to become earlier with an increase in accelerator travel and with an increase in engine speed. The influence time zone Tz is defined so as to become shorter with an increase in accelerator travel and with an increase in engine speed.

Figure 9:
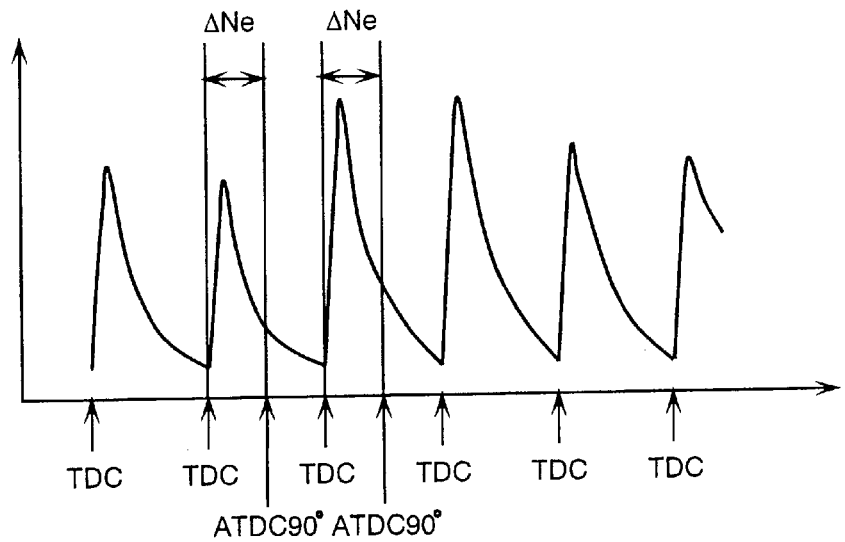
FIG. 9 is a diagrammatic view showing a variation in engine shaft torque with time.

Subsequently, a target value ΔNeref of a fluctuation in engine shaft torque ΔNe is determined at step S202. As shown in FIG. 9, the engine shaft torque fluctuation ΔNe, which is defined as a time between a top dead center of a compression stroke and an ATDC 90° CA, is determined on the basis of a signal from the crank angle sensor 9. Since the angular speed of an crankshaft becomes larger with an increase in engine shaft torque, a time between a top dead center of a compression stroke and a ATDC 90° CA becomes shorter with an increase in engine shaft torque, that is, the engine shaft torque fluctuation ΔNe becomes smaller. Accordingly, the the engine shaft torque fluctuation ΔNe corresponds to engine output. The target engine shaft torque fluctuation ΔNeref is a value that is expected when implementing the primary fuel injection only through steps S115 to S117 in the main routine shown in FIG. 4A. The target engine shaft torque fluctuation Δ Neref is empirically determined with respect to the amount of primary fuel injection Qr1 and primary fuel injection timing Tr1 and is electronically stored in the form of a map (not shown) in a memory of the electronic control unit 35.

A decision is made at step S204 as to whether the post-fuel injection is implemented for monitoring, and a decision is subsequently made at step S205 as to whether the post-fuel injection is finished. When the post-fuel injection is finished, after changing a time count T1 by an increment of 1 at step S206, a decision is made at step S207 as to whether the time count T1 exceeds the influence appearing time Tz1. When the time count T1 reaches the influence appearing time Tz1, at a point of time at which a crankshaft of a cylinder that is presently in an expression stroke reaches ATDC 90° CA at step S208, a time from ATDC 0° CA to ATDC 90° CA, namely an engine shaft torque fluctuation ΔNe is detected on the basis of a signal from the crank angle sensor 9 and then is stored. The calculation and storage of engine shaft torque fluctuation ΔNe is accomplished the time count reaches the influence disappearing time Tz2 at step S210.

Figure 10:
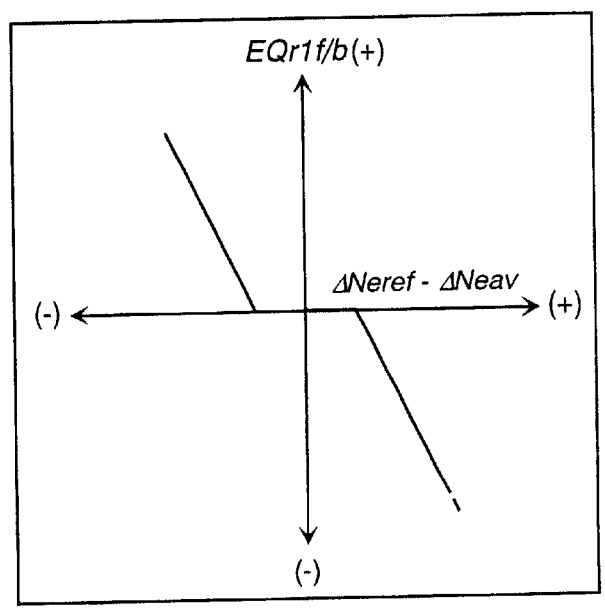
FIG. 10 is a control map of a main fuel injection amount feedback value with respect to deviation of a change in speed fluctuation shown by way of example.

Subsequently, after calculating a mean value of engine shaft torque fluctuations ΔNe that are stored in the memory in the time zone Tz as an average engine shaft torque fluctuation ΔNeav at step S211, a correction value Qr1F/B for feedback controlling the amount of primary fuel injection Qr1 is determined on the basis of a difference between the target engine shaft torque fluctuation ΔNeref and the average engine shaft torque fluctuation ΔNeav at step S212. As shown in FIG. 10, the correction value Qr1F/B is electronically determined and stored in the form of a map in a memory of the electronic control unit 35. The correction value Qr1F/B becomes larger in a minus direction with an increase in the difference between the target engine shaft torque fluctuation ΔNeref and the average engine shaft torque fluctuation ΔNeav when the target engine shaft torque fluctuation ΔNeref is larger than the average engine shaft torque fluctuation ΔNeav or in a plus direction when the target engine shaft torque fluctuation ΔNeref is smaller than the average engine shaft torque fluctuation ΔNeav. The map has a dead zone for predetermined small differences between the target engine shaft torque fluctuation ΔNeref and the average engine shaft torque fluctuation ΔNeav. Finally, after clearing the time count T1 and erasing the engine shaft torque fluctuations ΔNe in the memory at step S213, the final step orders return to the main routine, after the step in the main routine calling for the correction value determination subroutine.

In the main routine, when the primary fuel injection timing Tr1 is reached at step S111, the primary fuel injection is implemented at step S112. Subsequently, when the post-fuel injection timing Tr2 is reached at step S113, the post-fuel injection is implemented at step S114. Thereafter, a diagnosis of normality or abnormality of the fuel injection mode alteration is subsequently implemented through steps S118 to S124 shown in FIG. 4B. When the monitoring flag Fmon is down at step S118, the flow chart logic returns to the first step S101 for another sequence of the fuel injection mode alteration control. On the other hand, when the monitoring flag Fmon is up, a decision is made at step S119 as to whether the monitoring number N reaches a specified number N1. When the monitor post-fuel injection is not yet implemented N1 times, after integrating correction values Qr1F/B for feedback controlling the amount of primary fuel injection Qr1 that are obtained for first to the latest monitor post-fuel injection at step S120, the flow chart logic returns to the first step S101 for another sequence of the fuel injection mode alteration control.

On the other hand, when the monitor post-fuel injection is implemented N1 times, a decision is made at step S121 as to whether the integrated correction values Qr1F/B is less than a threshold value Gr1F/Bm. The fuel injection mode alteration control is judged as normal at step S122 when the integrated correction values Qr1F/B is less than the threshold value Gr1F/Bm. The result that the integrated correction values Qr1F/B is less than the threshold value Gr1F/Bm indicates that an increase in the HC content of exhaust gas is caused as expected by N1 times of the post-fuel injection and is reflected on engine output as a result of recirculation of the exhaust gas. On the other hand, it is judged as abnormal at step S123 when the integrated correction values Qr1F/B is greater than a predetermined value Gr1F/Bm. At step S123, a signal is provided to give a warning for abnormality. When fuel injection mode alteration control is judged either as normal at step S122 or as abnormal at step S123. Finally, after resetting the monitoring flag Fmon and the monitoring number N at step S124, the flow chart logic returns to the first step S101 for another sequence of the fuel injection mode alteration control.

As described above, because, although implementation causes an increase in the HC content of exhaust gas, what is used to judge whether the increase in the HC is as large as expected is a state of engine output which reflects recirculation of the exhaust gas, the diagnosis of normality or abnormality of the fuel injection mode alteration control does not lean on a sensor for detecting a concentration of a component of exhaust gas and is not affected by the temperature of exhaust gas. As a result, the diagnostic accuracy is guaranteed.

In place of diagnosing normality or abnormality of the fuel injection mode alteration control, the amount of primary fuel injection Qr1 may be corrected by the use of a correction value Qr1F/B.

Figure 6:
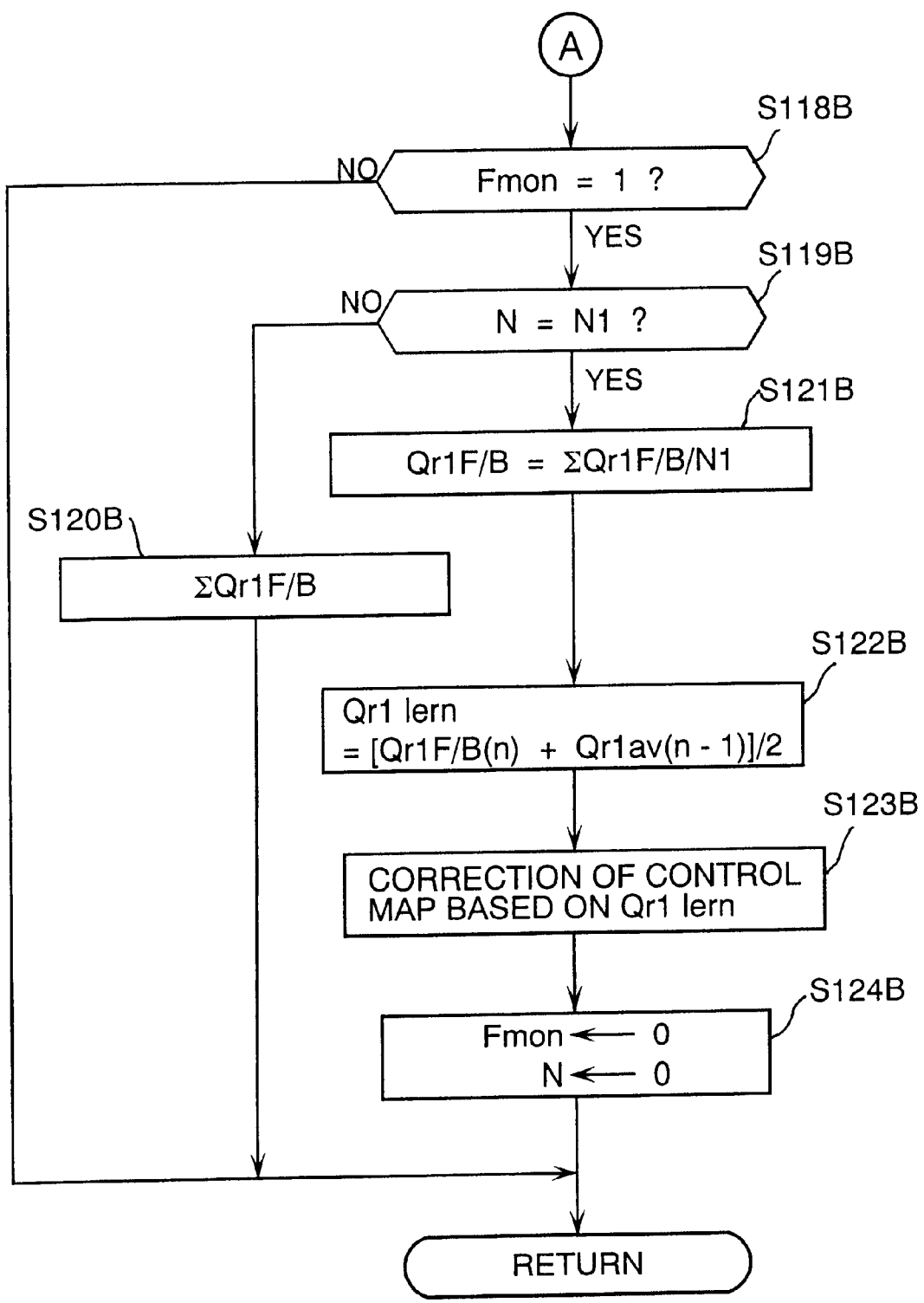
FIG. 6 is a flow chart illustrating a sequence routine of correction control of an amount of main fuel injection which is a part following a part of the sequence routine of fuel injection control shown in FIG. 4A.

FIG. 6 is a part of a flow chart illustrating a sequence routing of primary fuel injection correction control which succeeds the part of the main sequence routine of the fuel injection mode alteration control shown in FIG. 4A.

After implementation of the primary fuel injection and the post-fuel injection at steps S112 and S114, respectively, when the monitoring flag Fmon is down at step S118B, the flow chart logic returns to the first step S101 for another sequence of the fuel injection mode alteration control. On the other hand, when the monitoring flag Fmon is up, a decision is made at step S119B as to whether the monitoring number N reaches a specified number N1. When the monitor post-fuel injection is not yet implemented N1 times, after integrating correction values Qr1F/B for feedback controlling the amount of primary fuel injection Qr1 that are obtained for first to the latest monitor post-fuel injection at step S120B, the flow chart logic returns to the first step S101 for another sequence of the fuel injection mode alteration control.

On the other hand, when the monitor post-fuel injection is implemented N1 times, a mean value of the integrated correction values Qr1F/B is calculated and employed as a present mean correction value Qr1F/B(n) at step S111B. Subsequently, for the purpose of reflecting a last mean correction value Qr1F/B(n-1) on the present mean correction value Qr1F/B(n), an arithmetical mean correction value Qr1lern is calculated as a learning correction value on the basis of the last mean correction value Qr1F/B(n-1) and the present mean correction value Qr1F/B(n) at step S122B. The fuel injection control map for primary fuel injection such as shown in FIG. 8 is corrected according to the learning correction value Qr1lern at step S123B. Finally, after resetting the monitoring flag Fmon and the monitoring number N at step S124, the flow chart logic returns to the first step S101 for another sequence of the fuel injection mode alteration control.

Similar to the diagnosis of normality or abnormality of the fuel injection mode alteration control, because, although implementation causes an increase in the HC content of exhaust gas, what is used to judge whether the increase in the HC is as large as expected is a state of engine output which reflects recirculation of the exhaust gas, the correction of the amount of primary fuel injection does not lean on a sensor for detecting a concentration of a component of exhaust gas and is not affected by the temperature of exhaust gas. As a result, the correction of the amount of primary fuel injection is performed with an increased accuracy.

Because, when implementing the primary fuel injection only, correction of the fuel injection control map for primary fuel injection, which is made on the basis of a learning correction value Qr1lern as a correction value Qr1F/B for feedback controlling the amount of primary fuel injection Qr1, prevents a raise in engine output in excess due to the post-fuel injection. That is, implementation of the post fuel injection causes a change in exhaust gas composition (an increase in HC and CO content) only without raising engine output itself.

If determining a target engine shaft torque fluctuation ΔNeref on the basis of engine output that is expected when the post-fuel injection is implemented following the primary fuel injection and correcting the fuel injection control map for primary fuel injection with a learning correction value Qr1lern as a correction value Qr1F/B for feedback controlling the amount of primary fuel injection Qr1, the post-fuel injection stabilizes engine output when there is a demand for a raise in engine output while causing a raise in the HC content of exhaust gas. Further, if determining a target engine shaft torque fluctuation ΔNeref on the basis of engine output that is expected when the post-fuel injection is implemented following the primary fuel injection and correcting the fuel injection control map for post-fuel injection with a learning correction value Qr2lern as a correction value Qr2F/B for feedback controlling the amount of post-fuel injection Qr1, the post-fuel injection stabilizes the HC content of exhaust gas as well as engine output when there is a demand for a raise in engine output while causing a raise in the HC content of exhaust gas.

Although, in the above embodiment, the post-fuel injection is implemented following the primary fuel injection, an increase in the HC content of exhaust gas can be provided by implementing pre-fuel injection that is caused in a period from the beginning of an intake stroke to the primary fuel injection, likely by implementing the post-fuel injection. Further, in place of making a feedback correction of the amount of fuel injection or a correction of the fuel injection control map, it may be acceptable to make a feedback correction of fuel injection timing or a correction of a fuel injection timing control map.

Although the above embodiment is directed to an alteration between the single-shot fuel injection mode in which only the primary fuel injection is implemented and the two-shot fuel injection mode in which both primary fuel injection and post-fuel injection are implemented, the primary fuel injection may be modified in connection with providing a change in the HC content of exhaust gas. In this regard, the primary fuel injection is the fuel injection that is implemented at a point of time near a top dead center of a compression stroke and it does not matter whether the post-fuel injection or the pre-fuel injection is implemented. Specifically, multiple-shot fuel injection may be employed for the primary fuel injection. In this case, at least either one or both of the number of injection or the timing of injection are changed. The term "multiple-shot fuel injection" as used herein shall refer to fuel injection which divides a given amount of primary fuel injection into a plurality of parts and intermittently sprays them at points of time near a dead top center of a compression stroke so as to burn the fuel without brakes. The time for which the fuel injector is kept open to spray each part of fuel is preferably shorter than 800 $\mu$-seconds. The fuel injection interval $\Delta t$ between adjacent parts of fuel injection is preferably between 100 and 1000 $\mu$-seconds. The multiple-shot fuel injection is basically performed as follows.

Fuel that is sprayed by the fuel injector 5 spreads in the combustion chamber 4 forming a generally corn shaped fuel spray. The fuel spray repeatedly breaks up to fine drops due to friction with air and then evaporates to produce fuel vapors. Implementation of the multiple-shot fuel injection provides a proportion of premix combustion of a first part of fuel that is relatively small, so that, since there is no raise in combustion temperature and combustion pressure in excess at the beginning of combustion, NOx generation is lowered. The fuel injection interval $\Delta t$ that is longer than 100 $\mu$-seconds almost certainly prevents fuel drops from catching up fuel drops spread ahead of them. In particular, when implementing a second part of fuel injection after a top dead center of a compression stroke, the second part of fuel immediately burns and then a large raise in pressure is caused in the combustion chamber 4, which is accompanied by a raise in viscosity of the compressed air. As a result, drops of a third part of fuel is immediately slowed down, so as to be prevented from catching up the fuel drops spread ahead of them. Since the time for which the fuel injector 5 is kept open to spray each part of fuel is shorter than 800 $\mu$-seconds, the amount of fuel sprayed through each fuel injection is small, so as to restrict recombination of fuel drops to the minimum during implementation of the fuel injection. Therefore, a mixture of fuel vapors with air can be greatly improved by hastening atomization and evaporation of fuel which is achieved by raising fuel pressure so as to increase an injection speed. The fuel injection interval $\Delta t$ that is shorter than 1000 $\mu$-seconds causes a part of fuel to begin to burn before termination of combustion of a preceding part of fuel, so as to provide satisfactory combustion of fuel without breaks during implementation of the multiple-shot fuel injection.

In short, implementing the multiple-shot fuel injection which a given amount of fuel divided into a plurality of parts causes significantly satisfactory fuel combustion, as a result of which improvement of fuel consumption and control of smoke generation are realized. Further, while the multiple-shot fuel injection is relatively late in terminating, it causes satisfactory evaporation and then satisfactory diffusion combustion, so that, because the combustion chamber 4 is kept at a high pressure for a relatively long period of time, the expansion force of exhaust gas is significantly effectively exert on the piston 3. In consequence, the multiple-shot fuel injection provides improvement of fuel consumption due to an increased mechanical efficiency without providing aggravation of fuel combustion such as occurring when retarding a fuel injection timing.

While the multiple-shot fuel injection causes fuel to satisfactorily burn and, in consequence, lowers the HC content of exhaust gas as compared with the single-shot fuel injection, nevertheless, in either case where the number of injection is increased and where the injection interval is prolonged, it is relatively late in terminating, so as to increase the HC content of exhaust gas.

Figure 11:
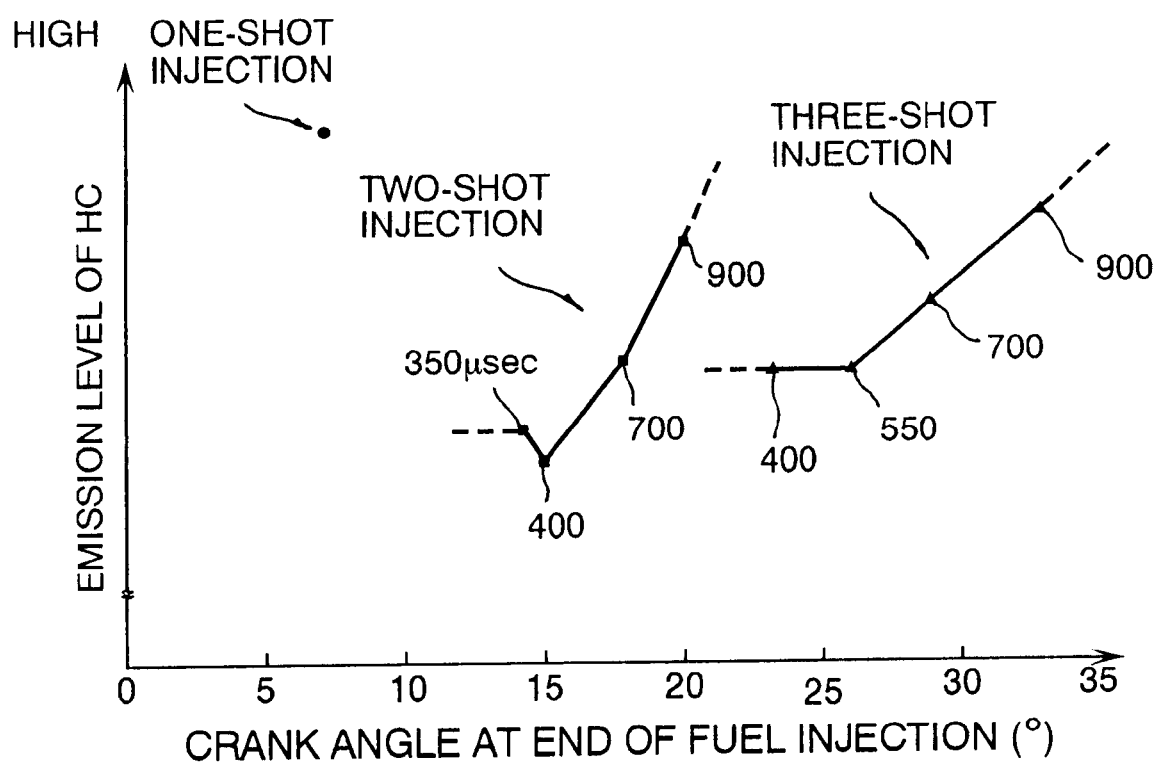
FIG. 11 is a diagram showing the relationship between the amount of smoke and a crank angle at an end of fuel injection.

FIG. 11 illustrates the result of an empirical study of effects of the number of injection and injection intervals of the multi-shot fuel injection as the primary fuel injection that are exerted on the HC content of exhaust gas. The study was made for the single-shot fuel injection which sprays a basic amount of fuel all together nearly at a top dead center of a compression stroke, two-shot fuel injection which sprays the basis amount of fuel divided into two equal parts and three-shot fuel injection which sprays the basis amount of fuel divided into three equal parts, respectively. The HC content of exhaust gas was investigated with respect to crank angle at termination of the multiple-shot fuel injection (termination crank angle) for various injection intervals, such as 350 $\mu$-seconds, 400 $\mu$-seconds, 700 $\mu$-seconds and 900 $\mu$-seconds for the two-shot fuel injection and 400 $\mu$-seconds, 450 $\mu$-seconds, 700 $\mu$-seconds and 900 $\mu$-seconds for the three-shot fuel injection.

As apparently demonstrated, the single-shot fuel injection provides the HC content of exhaust gas higher than both two-shot fuel injection and three-shot fuel injection. The three-shot fuel injection provides the HC content of exhaust gas higher than the two-shot fuel injection. Each of the two-shot fuel injection and the three-shot fuel injection provides an increase in the HC content of exhaust gas with an increase in injection interval. Therefore, diagnosis of normality or abnormality of the fuel injection mode alteration control or correction of fuel injection is performed on the basis of engine output varying according to exhaust gas recirculation when the HC content of exhaust gas is changed by modifying the primary fuel injection.

Figure 12:
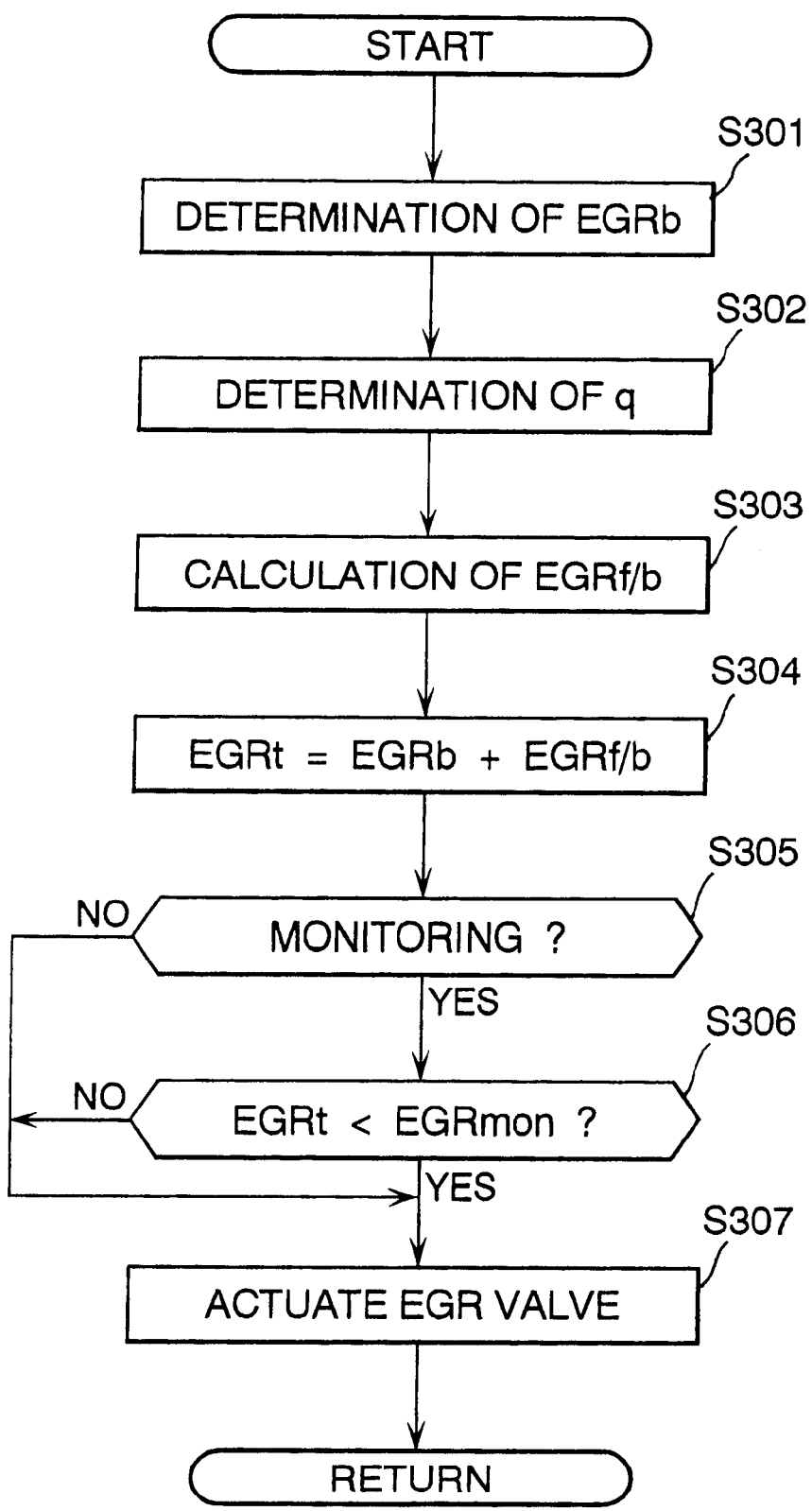
FIG. 12 is a flow chart illustrating a sequence routine of exhaust gas recirculation control.

FIG. 12 is a flow chart illustrating a sequence routine of the exhaust gas recirculation (EGR) control for the microcomputer of the electronic control unit 35.

Figure 13:
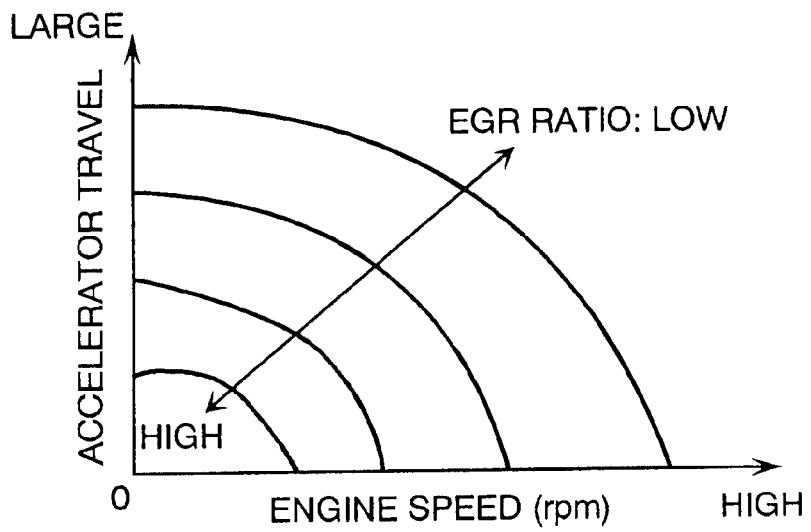
FIG. 13 is a control map of an exhaust gas recirculation ratio with respect to accelerator travel and engine speed shown by way of example.

When the flow chart logic commences and control proceeds to the first step S301 where various signals are read as control parameters from at least the crank angle sensor 9, the air flow sensor 11 and the accelerator travel sensor 32. Subsequently, at step S302, a basic exhaust gas recirculation ratio EGRb is read in on the basis of an accelerator travel and an engine speed obtained from an crank angle from an exhaust gas recirculation control map such as shown in FIG. 13. The exhaust gas recirculation control map defines exhaust gas recirculation ratio which is empirically determined with respect to engine speed and accelerator travel and is electronically stored in the memory of the electronic control unit 35. The basic exhaust gas recirculation ratio EGRb is defined such as to become higher with a decrease in accelerator travel and/or a decrease in engine speed. The term "exhaust gas recirculation ratio" as used herein shall mean and refer to a ratio of the amount of exhaust gas that is recirculated relative to the total amount of intake air that is introduced into the combustion chamber 4.

Figure 14:
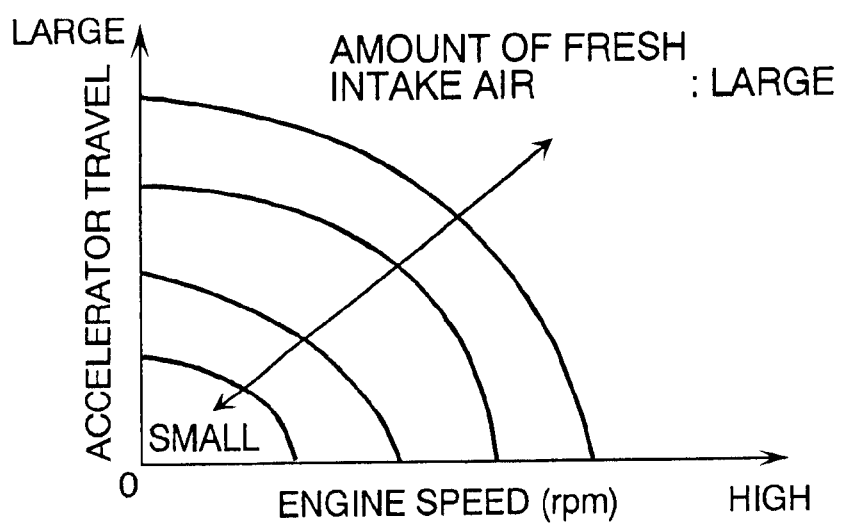
FIG. 14 is a map of the amount of fresh air with respect to accelerator travel and engine speed shown by way of example.
Figure 15:
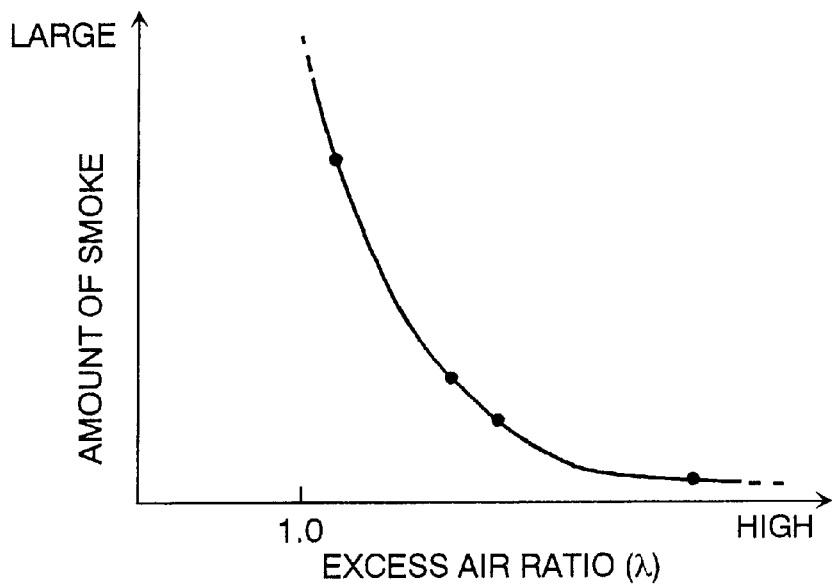
FIG. 15 is a diagram showing the amount of smoke with respect to excess air ratio.

At step S303, a target amount of fresh intake air $\underline{q}$ is read in on the basis of the accelerator travel and the engine speed from a fresh intake air control map such as shown in FIG. 14. The fresh intake air control map defines the amount of fresh intake air which is empirically determined with respect to engine speed and accelerator travel and is electronically stored in the memory of the electronic control unit 35. The target amount of fresh intake air $\underline{q}$ is defined such as to become higher with an increase in accelerator travel and/or an increase in engine speed. The term "amount of fresh intake air" as used herein shall mean and refer to an amount of air obtained by subtracting an amount of exhaust gas that is recirculated into an intake air stream from the total amount of air that is introduced into the combustion chamber 4. The amount of fresh intake air is a measurement that is detected by the air flow sensor 11. Generally, a direct-injection diesel engine is characterized, on one hand, by controlling generation of NOx lower as an air-fuel ratio in the combustion chamber 4 (which is referred to as a combustion chamber air-fuel ratio) is lowered by increasing the amount of exhaust gas recirculation and, on the other hand, by causein a sharp increase in the amount of smoke when a combustion chamber air-fuel ratio becomes too low. Therefore, the basic exhaust gas recirculation ratio EGRb and the target amount of fresh intake air $\underline{q}$ are set such that a combustion chamber air-fuel ratio is provided as small as possible within a range where no sharp increase in the amount of smoke occurs.

Figure 16:
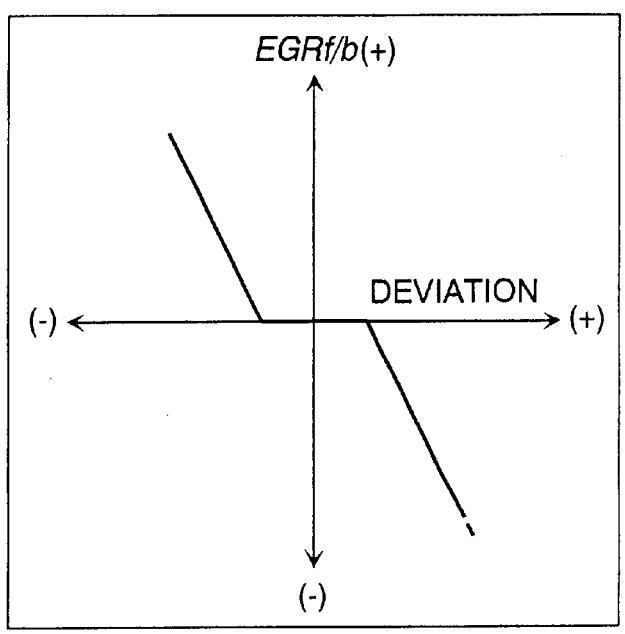
FIG. 16 is a control map of an exhaust gas recirculation amount feedback value with respect to deviation of a change in the amount of fresh air shown by way of example.

Subsequently, at step S304, a correction value EGRf/b for feedback controlling the exhaust gas recirculation ratio is read in from a correction value map such as shown in FIG. 16 on the basis of the difference the actual amount of fresh intake air detected by the air flow sensor 11 from the target amount of fresh intake air $\underline{q}$. The correction value EGRf/b becomes smaller with an increase in the difference between the target amount of fresh intake air and the actual amount of fresh intake air when the target amount of fresh intake air is larger than the actual amount of fresh intake air or becomes larger with an increase in the difference between the target amount of fresh intake air and the actual amount of fresh intake air when the target amount of fresh intake air is smaller than the actual amount of fresh intake air. The map has a dead zone for predetermined small differences between the target amount of fresh intake air and the actual amount of fresh intake air.

After determining a target exhaust gas recirculation ratio EGRt by adding the correction value EGRf/b to the basic exhaust gas recirculation ratio EGRb at step S305, a decision is made at step S306 as to whether it is under monitoring on the basis of engine output. When it is under monitoring, another decision is subsequently made at step S307 as to whether the target exhaust gas recirculation ratio EGRt is greater than a critical ratio EGRmon for monitoring. When the target exhaust gas recirculation ratio EGRt is still less than a critical ratio EGRmon, the critical ratio EGRmon is substituted for the target exhaust gas recirculation ratio EGRt at step S308. Finally, the electromagnetic valve 28 is provided with a control signal according to the target exhaust gas recirculation ratio EGRt, namely the critical ratio EGRmon in this event, to drive the exhaust gas recirculation (EGR) valve 24 at step S309. The flow chart logic returns to the first step S301 for another sequence of the exhaust gas recirculation control.

When it is out of monitoring or when the target exhaust gas recirculation ratio EGRt is greater than a critical ratio EGRmon, the electromagnetic valve 28 is provided with a control signal according to the target exhaust gas recirculation ratio EGRt to drive the exhaust gas recirculation (EGR) valve 24 at step S309. Then the flow chart logic returns to the first step S301 for another sequence of the exhaust gas recirculation control.

With the exhaust gas recirculation control, since the target exhaust gas recirculation ratio EGRt, in other words, the amount of exhaust gas recirculation, is increased, when it is smaller than the critical ratio EGRmon, a raise in the HC content of exhaust gas due to a change in combustion state is reflected on engine output through recirculation of the exhaust gas, a diagnostic error of the fuel injection mode alteration control and an wrong correction of the fuel injection control are prevented or significantly reduced.

Although the present invention is applicable to a gasoline engine as well as a diesel engine with the same result.

It is to be understood that although the present invention has been described in detail with respect to the preferred embodiments thereof, various other embodiments and variants may occur to those skilled in the art, which are within the scope and spirit of the invention, and such other embodiments and variants are intended to be covered by the following claims.

What is claimed is:

1. A diagnostic system for diagnosing normality of control of an engine which is equipped with a fuel injector for supplying fuel into a combustion chamber, exhaust gas control means for controlling a change in composition of exhaust gas from said engine so as to cause a change in HC concentration of said exhaust gas according to engine operating conditions and an exhaust gas recirculation system for recirculating partly exhaust gas into an intake system of said engine, said diagnostic system comprising:

output detecting means for detecting engine output of said engine; and diagnostic means for making a diagnosis of abnormality of said control of said change in composition of said exhaust gas when said engine output does not cause a predetermined change meeting said change in HC concentration of said recirculated exhaust gas after said change in composition of said exhaust gas.

2. A diagnostic system as defined in claim 1, wherein said output detecting means detects a physical quantity relating to shaft torque of said engine and said diagnostic means makes said diagnosis on the basis of said physical quantity.

3. A diagnostic system as defined in claim 1, wherein said fuel injector is disposed so as to spray fuel directly into a combustion chamber of said engine and said exhaust gas control means controls a number of times and timings of fuel injection in a period from the beginning of an intake stroke and an end of an exhaust stroke according to said engine operating conditions.

4. A diagnostic system as defined in claim 1, wherein said exhaust gas recirculation system increases an amount of exhaust gas recirculation in an event where said amount of exhaust gas recirculation is less than a predetermined amount when said making said diagnostic means makes said diagnosis.

5. A diagnostic system for diagnosing normality of control of an engine which is equipped with a fuel injector for supplying fuel into a combustion chamber, exhaust gas control means for controlling a change in composition of exhaust gas from said engine so as to cause a change in HC concentration of said exhaust gas according to engine operating conditions and an exhaust gas recirculation system for recirculating partly exhaust gas into an intake system of said engine, said diagnostic systemcomprising:

output detecting means for detecting engine output of said engine;

fuel injection control means for detecting a change in said engine output following said change in HC concentration of said recirculated exhaust gas and feedback controlling an amount of fuel injection, that is sprayed by said fuel injector, on the basis of said engine output so as to provide a predetermined engine output; and diagnostic means for making a diagnosis of abnormality of said control of said change in composition of said exhaust gas when a correction value for said feedback control of said amount of fuel injection exceeds a predetermined extent.

6. An engine control system for controlling of an engine which is equipped with a fuel injector for supplying fuel into a combustion chamber, exhaust gas control means for controlling of a change in composition of exhaust gas from said engine so as to cause a change in HC concentration of said exhaust gas according to engine operating conditions and an exhaust gas recirculation system for recirculating partly exhaust gas into an intake system of said engine, said engine control system comprising:

output detecting means for detecting engine output of said engine; and correction means for detecting a change in said engine output following said change in HC concentration of said recirculated exhaust gas and correcting said control of said change in composition of said exhaust gas on the basis of said change in said engine output.

7. An engine control system for controlling of an engine which is equipped with a fuel injector for supplying fuel into a combustion chamber, exhaust gas control means for controlling of a change in composition of exhaust gas from said engine so as to cause a change in HC concentration of said exhaust gas according to engine operating conditions and an exhaust gas recirculation system for recirculating partly exhaust gas into an intake system of said engine, said engine control system comprising:

output detecting means for detecting engine output of said engine; and fuel injection control means for detecting a change in said engine output following said change in HC concentration of said recirculated exhaust gas and feedback controlling an amount of fuel injection, that is sprayed by said fuel injector, on the basis of said engine output so as to provide a predetermined engine output.

* * * * *